US009630325B2

(12) United States Patent
Wang et al.

(10) Patent No.: US 9,630,325 B2
(45) Date of Patent: Apr. 25, 2017

(54) CARRYING DEVICE AND MOVING SYSTEM

(71) Applicants: BOE TECHNOLOGY GROUP CO., LTD., Beijing (CN); BEIJING BOE DISPLAY TECHNOLOGY CO., LTD., Beijing (CN)

(72) Inventors: Hui Wang, Beijing (CN); Yuanfu Bao, Beijing (CN); Ying Liu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/801,766

(22) Filed: Jul. 16, 2015

(65) Prior Publication Data
US 2016/0243706 A1 Aug. 25, 2016

(30) Foreign Application Priority Data
Jan. 26, 2015 (CN) .......................... 2015 1 0038771

(51) Int. Cl.
*B25J 15/06* (2006.01)
(52) U.S. Cl.
CPC ................. *B25J 15/0616* (2013.01)
(58) Field of Classification Search
CPC ..... B25J 15/0616; H01L 21/6838; B66C 1/02
See application file for complete search history.

(56) References Cited

U.S. PATENT DOCUMENTS

| 2005/0117110 A1* | 6/2005 | Byun | G02F 1/1341 349/187 |
| --- | --- | --- | --- |
| 2009/0042368 A1* | 2/2009 | Sekiya | H01L 21/78 438/460 |
| 2010/0327575 A1* | 12/2010 | Blanchard | F16L 37/1215 285/34 |
| 2012/0103400 A1* | 5/2012 | Chiba | H01G 9/2081 136/251 |
| 2012/0325657 A1* | 12/2012 | Yamamoto | G01N 27/08 204/403.01 |

FOREIGN PATENT DOCUMENTS

| CN | 201357604 Y | 12/2009 |
| --- | --- | --- |
| CN | 103192422 A | 7/2013 |
| CN | 203109844 U | 8/2013 |
| CN | 103832784 A | 6/2014 |
| CN | 103832874 A | 6/2014 |
| CN | 103848177 A | 6/2014 |
| CN | 203845446 U | 9/2014 |

(Continued)

OTHER PUBLICATIONS

First Chinese Office Action (including English translation) dated Apr. 19, 2016, for corresponding Chinese Application No. 201510038771.4.

(Continued)

*Primary Examiner* — Stephen Vu
(74) *Attorney, Agent, or Firm* — Kinney & Lange, P.A.

(57) ABSTRACT

A carrying device comprises: a base; an adsorption part disposed on the base; a plurality of adsorption holes formed in the adsorption part; and an insert having an end inserted in the adsorption part such that one or more of the adsorption holes are switchable between an open state and a closed state.

9 Claims, 3 Drawing Sheets

(56) References Cited

FOREIGN PATENT DOCUMENTS

KR    20100137691 A    12/2010
KR    20130134806 A    12/2013

OTHER PUBLICATIONS

Second Chinese Office Action (including English translation) dated Sep. 12, 2016, for corresponding Chinese Application No. 201510038771.4.
Third Chinese Office Action, for Chinese Patent Application No. 2015100387714, dated Feb. 16, 2017, 10 pages.

* cited by examiner

US 9,630,325 B2

CARRYING DEVICE AND MOVING SYSTEM

CROSS-REFERENCE TO RELATED APPLICATION

This application claims the benefit of Chinese Patent Application No. 201510038771.4 filed on Jan. 26, 2015 in the State Intellectual Property Office of China, the whole disclosure of which is incorporated herein by reference.

BACKGROUND OF THE INVENTION

1. Field of the Invention

Embodiments of the present invention relate to a carrying device and a moving system.

2. Description of the Related Art

As shown in FIG. 1, a conventional COF (Chip On Film) carrying device fixes a COF for a thin film transistor liquid crystal display (TFT-LCD) by vacuum adsorption. The COF carrying device comprises a base 1 and an adsorption part 2 mounted to the base 1. A plurality of adsorption holes 4 are formed in the adsorption part 2. When the COFs having different widths are produced, different numbers of adsorption holes are needed. Therefore, a size of the entire carrying device also needs to be changed according to the number of the adsorption holes. When a size of the COF is changed, the COF carrying device needs to be replaced with a different one. As a result, a manufacturing cost is increased and the replacement is cumbersome. In addition, the conventional COF carrying device does not have a device for preventing the COF from falling. When carrying the COF, there is a very great probability that the COF falls due to a high moving speed and a large weight of the COF, thereby resulting in an unnecessary loss.

Therefore, in view of the above defects, there is a need for a carrying device and a moving system which can be suitable for carrying COFs having different widths and prevent the COF from falling.

SUMMARY OF THE INVENTION

An object of embodiments of the present invention is to provide a carrying device and a moving system which can be suitable for carrying COFs having different widths.

Embodiments of the present invention provide a carrying device comprising: a base; an adsorption part disposed on the base; a plurality of adsorption holes formed in the adsorption part; and an insert having an end inserted in the adsorption part such that one or more of the adsorption holes are switchable between an open state and a closed state.

Embodiments of the present invention also provide a moving system comprising a manipulator and the carrying device mounted to the manipulator.

Figure 1:
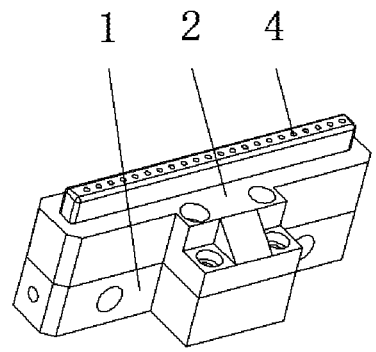
FIG. 1 is a schematic structural view of a conventional COF carrying device.

List of reference numerals: 1. base; 2. adsorption part; 3. insert; 4. adsorption hole; 5. passage; 6. support; 7. guide rod; and 8. connection hole.

DETAILED DESCRIPTION OF THE EMBODIMENTS

A further description of the invention will be made in detail as below with reference to embodiments of the present invention taken in conjunction with the accompanying drawings. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to a general concept of embodiments of the present invention, there is provided a carrying device comprising: a base; an adsorption part disposed on the base; a plurality of adsorption holes formed in the adsorption part; and an insert having an end inserted in the adsorption part such that one or more of the adsorption holes are switchable between an open state and a closed state.

According to a general concept of embodiments of the present invention, there is also provided a moving system comprising a manipulator and the carrying device mounted to the manipulator.

In the carrying device according to the embodiments of the present invention, the end of the insert is inserted in the adsorption part such that one or more of the adsorption holes are switchable between the open state and the closed state, thereby controlling a number of opened ones of the adsorption holes so that the carrying device can be used for all of the COFs of different widths, thereby effectively solving the problem that the conventional carrying device needs to be frequently replaced according to the COFs of different widths.

A further description of the invention will be made in detail as below with reference to embodiments of the present invention taken in conjunction with the accompanying drawings. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
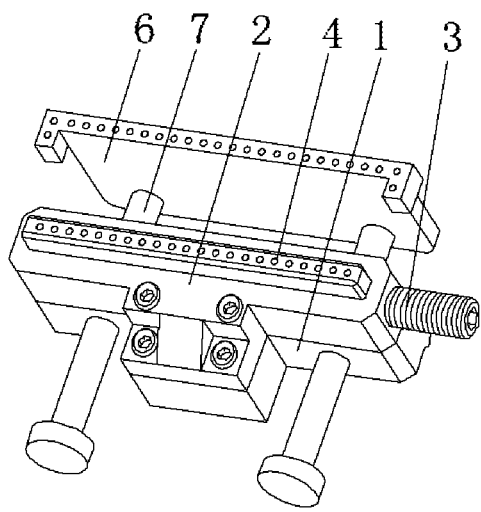
FIG. 2 is a schematic structural view of a carrying device according to an embodiment of the present invention.
Figure 3:
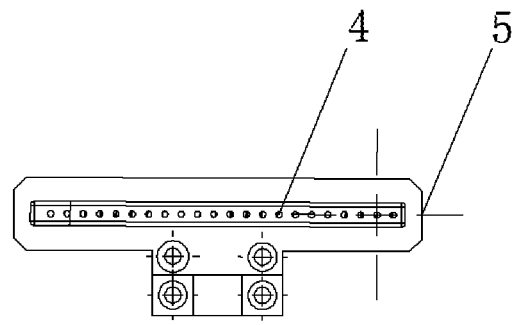
FIG. 3 is a top view of an adsorption part according to an embodiment of the present invention.
Figure 4:
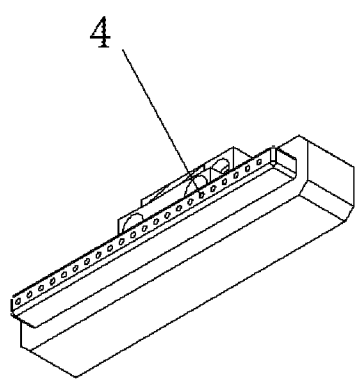
FIG. 4 is a perspective view of the adsorption part according to the embodiment of the present invention.
Figure 5:
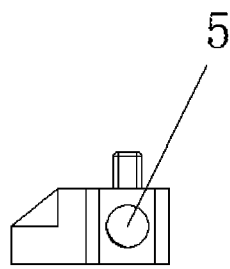
FIG. 5 is a side view of the adsorption part according to the embodiment of the present invention.
Figure 8:
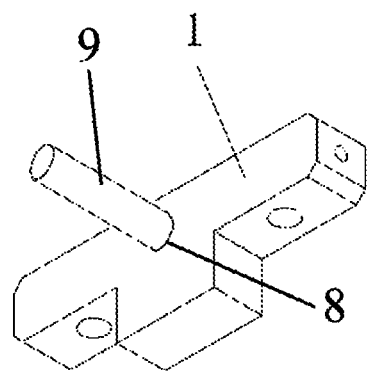
FIG. 8 is a perspective view of the base according to the embodiment of the present invention.

As shown in FIGS. 2 and 8, a carrying device according to an embodiment comprises: a base 1; an adsorption part 2 disposed on the base 1; a plurality of adsorption holes 4 formed in the adsorption part 2; and an insert 3 having an end inserted in the adsorption part 2 such that one or more of the adsorption holes 4 are switchable between an open state and a closed state. In use, the adsorption holes 4 are connected to an evacuating air tube 9, for adsorbing a circuit board to be transferred, such as a COF. The end of the insert 3 is inserted in the adsorption part 2 (for example, by rotating the insert 3) such that one or more of the adsorption holes 4 are switchable between the open state and the closed state, thereby controlling a number of opened ones of the adsorption holes 4. Finally, the carrying device can be used for all of the COFs of different widths. In other words, the carrying device is suitable for carrying the COFs of different widths.

In an example as shown in FIGS. 2-5, the carrying device further comprises: a passage 5 which is formed in the adsorption part 2 and is in communication with the plurality of adsorption holes 4. The end of the insert 4 is inserted in the passage 5 and the insert 5 is movable in a length direction of the passage 5 such that one or more of the adsorption holes 4 are switchable between the open state and the closed state.

In an example, referring to FIGS. 3-5 and 8, each of the plurality of adsorption holes 4 has one end opening into the passage 5, and the other end opening to an outside of the adsorption part 2. For example, the other end of the adsorption hole 4 is exposed to the outside of the adsorption part 2 from an adsorption surface of the adsorption part 2. The passage 5 may also be connected to the evacuating air tube 9 so as to provide each adsorption hole 4 with a vacuum adsorption force. Furthermore, the end of the insert 3 is inserted in the passage 5 and the end of the insert 3 or the insert 3 may be in tight contact with an inner wall of the passage 5 in order to seal one or more of the adsorption holes 4. In addition, the insert 3 is also movable in the length direction of the passage 5. One or more of the adsorption holes 4 are controlled to be switchable between the open state and the closed state by moving the end of the insert 3 in the passage 5.

Generally, the width of the COF is 28-65 mm and a specific size of the COF depends on a design of a product. For COFs with a greater width, an insertion depth of the insert 3 can be decreased so that more adsorption holes 4 are in the open state; while for COFs with a smaller width, the insertion depth of the insert 3 can be increased so that less adsorption holes 4 are in the open state.

In some embodiments, the plurality of adsorption holes 4 are arranged at intervals in the length direction of the passage 5. The passage 5 may comprise a straight passage to facilitate entering and sealing of the insert 3. The plurality of adsorption holes 4 are arranged in a plane parallel to a longitudinal direction of the passage 5. The other ends of the plurality of adsorption holes 4 are uniformly arranged in a straight line and form an adsorption surface at a top of the adsorption part 2 for adsorbing and fixing the COFs with different widths.

In order to facilitate operation of the insert 3, the insert 3 enters the adsorption part 2 in a rotatable manner. Accordingly, the passage 5 is a threaded hole and the insert 3 is a screw fitted in the threaded hole.

Figure 6:
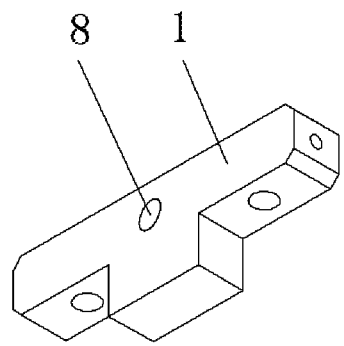
FIG. 6 is a perspective view of a base according to an embodiment of the present invention.

Furthermore, as shown in FIGS. 6 and 8, a connection hole 8 for connecting to the evacuating air tube 9 is also formed in the base 1. The connection hole 8 is in communication with the passage 5. In other words, the adsorption holes 4 is in communication with the evacuating air tube 9 through the passage 5 and the connection hole 8.

A portion of the carrying device where the base 1 and the adsorption part 2 are in contact with each other needs to be maintained in a sealed state all along to prevent air leakage. Furthermore, the adsorption part 2 may be fastened to the base 1 by means of bolts.

Figure 7:
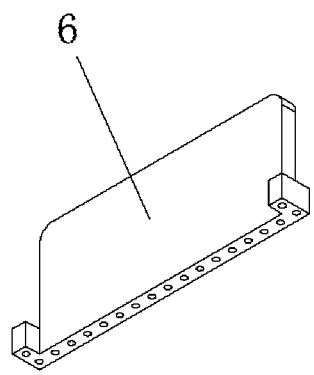
FIG. 7 is a perspective view of a support according to an embodiment of the present invention.

As shown in FIGS. 2 and 7, the carrying device according to the embodiment further comprises a support 6 disposed on a side of the base 1 and having a top flush with the adsorption surface of the adsorption part 2. The support 6 plays an auxiliary supporting role so as to prevent an adsorbed COF from falling due to a high carrying moving speed and a large weight of the COF and the like, thereby reducing an unnecessary loss.

Furthermore, the support 6 is disposed on the side of the base 1 by means of a guide rod 7 and is slidable in an axial direction of the guide rod 7 to facilitate operation of the support 6.

In some embodiments, the guide rod 7 comprises two guide rods. The two guide rods 7 are perpendicular to the base 1 and are located on either side of the connection hole 8, respectively. The two guide rods 7 pass through mounting holes in the base 1, respectively, and the support 6 is slidably connected to the two guide rods 7 so that the support 6 is slidable in the axial direction of the guide rods 7. In other words, the support 6 is slidable towards or away from the base 1 so that it can be flexibly adjusted according to the COFs of different sizes. For example, mounting holes are formed in the support 6, and the guide rods 7 pass through the mounting holes so that the support 6 is slidable along the guide rods 7. The support 6 may also be fixedly connected to the two guide rods 7 and the guide rods 7 are slidable in the mounting holes of the base 1.

Embodiments of the present invention also provide a moving system comprising a manipulator and the carrying device mounted to the manipulator and movable with the manipulator.

The moving system further comprises an evacuating device such as a vacuum pump. The evacuating device is in communication with the connection hole 8 in the base 1 through the evacuating air tube 9 and thus in communication with the passage 5 and the adsorption holes 4. The number of opened ones of the adsorption holes 4 is controlled by the insert 3. Furthermore, the base 1 is fixed to the manipulator and is movable synchronously with the manipulator.

Therefore, in the carrying device according to the embodiments of the present invention, the end of the insert is inserted in the passage in the adsorption part such that one or more of the adsorption holes are switchable between the open state and the closed state, thereby controlling a number of opened ones of the adsorption holes so that the carrying device can be used for all of the COFs of different widths, thereby effectively solving the problem that the conventional carrying device needs to be frequently replaced according to the COFs of different widths. In addition, with the support of the carrying device, the probability that the COF falls is effectively decreased. The carrying device has a simple structure and can be conveniently operated.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

What is claimed is:

1. A carrying device comprising:
   a base;
   an adsorption part disposed on the base;
   a plurality of adsorption holes formed in the adsorption part;
   an insert having an end inserted in the adsorption part such that one or more of the adsorption holes are switchable between an open state and a closed state; and a passage which is formed in the adsorption part and is in communication with the plurality of adsorption holes, wherein:

the end of the insert is inserted in the passage and the insert is movable in a length direction of the passage such that one or more of the adsorption holes are switchable between the open state and the closed state, and the passage is a threaded hole and the insert is a screw fitted in the threaded hole.

2. The carrying device of claim 1, wherein:
the insert is in tight contact with an inner wall of the passage.

3. The carrying device of claim 1, wherein:
the plurality of adsorption holes are arranged at intervals in the length direction of the passage.

4. The carrying device of claim 1, wherein:
a connection hole for connecting to an evacuating air tube is formed in the base, and the connection hole is in communication with the passage in the adsorption part.

5. The carrying device of claim 1, wherein:
each of the plurality of adsorption holes has a first end opening into the passage, and a second end opening to an outside of the adsorption part.

6. The carrying device of claim 1, further comprising:
a support disposed on a side of the base.

7. The carrying device of claim 6, further comprising:
a guide rod by means of which the support is disposed on the side of the base, wherein the support is slidable in an axial direction of the guide rod.

8. The carrying device of claim 7, wherein:
the guide rod comprises two guide rods, the two guide rods pass through mounting holes in the base, respectively, and the support is slidably connected to the two guide rods.

9. A moving system comprising:
a manipulator; and
the carrying device according to claim 1 which is mounted to the manipulator.

* * * * *